MANUFACTURE OF SHIRRED CASINGS

Filed Jan. 15, 1962 16 Sheets-Sheet 1

INVENTOR.
WALTER V. MARBACH
BY
Richard S. Shreve, Jr.
ATTORNEY

INVENTOR.
WALTER V. MARBACH
BY Richard S. Shreve Jr.
ATTORNEY

Dec. 1, 1964 W. V. MARBACH 3,158,896

MANUFACTURE OF SHIRRED CASINGS

Filed Jan. 15, 1962 16 Sheets-Sheet 3

INVENTOR.
WALTER V. MARBACH

BY Richard S. Shreve, Jr.

ATTORNEY

Dec. 1, 1964 W. V. MARBACH 3,158,896

MANUFACTURE OF SHIRRED CASINGS

Filed Jan. 15, 1962 16 Sheets-Sheet 4

INVENTOR.
WALTER V. MARBACH
BY
Richard S. Shreve Jr.
ATTORNEY

Dec. 1, 1964 W. V. MARBACH 3,158,896

MANUFACTURE OF SHIRRED CASINGS

Filed Jan. 15, 1962 16 Sheets-Sheet 5

INVENTOR.
WALTER V. MARBACH
BY
Richard S Shreve Jr
ATTORNEY

Dec. 1, 1964 W. V. MARBACH 3,158,896

MANUFACTURE OF SHIRRED CASINGS

Filed Jan. 15, 1962 16 Sheets-Sheet 6

INVENTOR.
WALTER V. MARBACH
BY Richard S. Shreve, Jr.
ATTORNEY

Dec. 1, 1964 W. V. MARBACH 3,158,896

MANUFACTURE OF SHIRRED CASINGS

Filed Jan. 15, 1962 16 Sheets-Sheet 7

INVENTOR.
WALTER V. MARBACH

BY Richard S. Shreve Jr.

ATTORNEY

INVENTOR
WALTER V. MARBACH
BY Richard S. Shreve Jr.
ATTORNEY

INVENTOR.
WALTER V. MARBACH
BY
Richard S. Shreve, Jr.
ATTORNEY

INVENTOR.
WALTER V. MARBACH
BY Richard S Shreve Jr
ATTORNEY

INVENTOR.
WALTER V. MARBACH
BY
Richard S. Shreve, Jr.
ATTORNEY

INVENTOR.
WALTER V. MARBACH
BY
Richard S. Shreve Jr.
ATTORNEY

Dec. 1, 1964 W. V. MARBACH 3,158,896

MANUFACTURE OF SHIRRED CASINGS

Filed Jan. 15, 1962 16 Sheets-Sheet 13

INVENTOR.
WALTER V. MARBACH

BY Richard S. Shreve Jr.

ATTORNEY

INVENTOR.
WALTER V. MARBACH
BY
Richard S. Shreve Jr.
ATTORNEY

INVENTOR
WALTER V. MARBACH
BY Richard S. Shreve Jr.
ATTORNEY

INVENTOR.
WALTER V. MARBACH
BY
Richard S Shreve Jr
ATTORNEY

United States Patent Office
3,158,896
Patented Dec. 1, 1964

3,158,896

MANUFACTURE OF SHIRRED CASINGS

Walter V. Marbach, Palos Heights, Ill., assignor to Union Carbide Corporation, a corporation of New York Filed Jan. 15, 1962, Ser. No. 166,023
8 Claims. (Cl. 17—45)

This invention relates to methods of shirring tubing to form casings for sausage.

It is the main object of the present invention to avoid the disadvantages of manual operation, and to provide an automatic controlled shirred casing length, compressed transfer, shirring machine for carrying out the desired operations for shirring sausage casings.

Other objects are to provide shirred and compressed cellulosic sausage casings of an exact casing length and with a maximum hole diameter, and to automatically measure exact lengths of casings from a plurality of supply reels and sever them contiguous to the terminus of shirred casing.

Further objects of this invention are to withdraw the shirring means from a zone of shirring at termination of a shirring cycle, to permit severing the shirred casing at a terminal pleat, and to re-establish the pleat pattern in the casing at the start of the shirring cycle when the shirring means is returned to the zone of shirring; and to automatically retract and advance a shirring passage which grips the moving inflated casing, and when the casing is halted and uninflated, rotate the shirring passage to remove folds, creases or slack from the wall of the casing, prior to start of the shirring cycle.

Other general objects are to automatically control the forward movement of loosely compressed casing leaving the shirring zone, the control means simultaneously firmly compressing the adjacent previously shirred piece of tubing; to automatically separate cut pieces of casing shirred on a mandrel and transfer the advanced piece to and through a mandrel supporting clamp without deranging the shirred pleat pattern; to compress a shirred casing in a plurality of compression stages wherein at at least one stage, the compression force is uniformly and gradually applied; to automatically and successively shirr a measured length of flattened cellulosic tubing to a shirred tube of a large hole size, firmly compress a preceding shirred tubing, tightly compress a preceding shirred tubing on a common mandrel, and restrain to prevent lengthwise expansion of a preceding shirred tubing on a doffing mandrel; and to provide an automatic shirring machine with components of each successive operation step of the cycle interlocked to interrupt the cycle, unless functioning safely.

It is a further object to apply the compressing force gradually to the axis of the loosely compressed shirred casing, and to maintain the casing under the final compression force for an extended time interval.

According to the present invention, sausage casings are manufactured by shirring a measured length of flattened cellulosic tubing on a mandrel as a first stage, severing the measured length from unshirred casing supply, applying axial force to the trailing end of said shirred length to advance it further along the mandrel and subject it to compression as a second stage and in a third stage tightly compressing the shirred casing by applying axial force to the trailing end of said advanced second stage length.

The casing is processed in three separate stages. In the shirring stage, the casing is condensed to about $\frac{1}{25}$ the original length. In the compressed stage, it is condensed to about $\frac{1}{50}$ the original length. In the tightly compressed stage, it is further compressed to about $\frac{1}{75}$ the original length, and then retained in compression until transferred to a doffing station.

The flattened tubing is passed from metering and feeding rolls onto a mandrel. The leading end of the shirring mandrel has a cylindroconical tip to assist in shirring startup at a supply reel change, and improve supply and distribution of the lubricated inflation air. The air supply is vented into the casing on the conical portion of the tip and thus is more effectively trapped by the casing upstream of the cylindrical portion of the tip. The air flows over the cylindrical portion of the tip to assist in centering and advancing the casing; and downstream of the tip, is vented to the atmosphere through a central passage in the mandrel.

Two pairs of annular grooved rolls are arranged in tandem to provide central spaced passages intermediate the metering rolls and shirring passage, to align and support over 20 percent of the casing in the span between the metering rolls and the shirring passage. The tip of the mandrel is positioned intermediate the spaced alignment passages to ensure advancing the casing centrally on the mandrel at startup and to assist in threading up the casing at a reel change.

The new machine has an arrangement for momentarily increasing the pressure of casing inflating air from about 6 p.s.i. normally used to about 18 p.s.i., to stiffen and advance the inflated tubing thereby enabling the shirring means to effectively grip and pleat the casing at startup. The acceleration rate of the machine drive at startup of the shirring cycle is slowed down about 60 percent of normal acceleration rate to permit the open end of the casing to seal itself against the adjacent holdback surface before high speed shirring begins.

Lubrication of the cogs of the shirring rolls and interior of the cellulosic casing with a suitable lubricant is essential to facilitate shirring of the casing and to avoid abrasion damage thereto.

After a desired length of casing has been shirred, the feed rolls and the shirring action of the head are stopped. The head is then retracted from the shirred casing, thereby exposing unshirred casing for manipulation by a casing severing and transferring member.

The method involves moving a typical shirring head component, at the termination of a shirring cycle, by retracting it from and returning it to a zone of shirring on a mandrel. By this means, the terminal pleat of shirred casing is exposed for severing the shirred portion from the unshirred strand of casing, and thus the resultant piece of casing may be transferred to a compressing zone and then doffed from the machine. The typical shirring head component is returned to the zone of shirring immediately prior to the start of the succeeding shirring cycle.

To sever the unshirred casing exactly adjacent to the terminus of the shirred casing, the unshirred casing is encircled and gripped by a powdered grip member immediately trailing the terminus of the shirring, then the gripping means are advanced on the mandrel to locally stress the casing between the gripping means and halted metering rolls and thereby sever the casing at the leading edge of the grip member.

The advancing powered-grip member thus tends to remove slack and folds from the unshirred strand restrained by the halted feed rolls. However, when the shirring head is advanced, the shirring passage must be simultaneously rotated forward relative to the movement along the mandrel, in a manner to tend to advance the casing, otherwise the fold flaws or slack may again appear in the unshirred strand.

At the termination of the shirring cycle, the feed rolls are halted immediately prior to the shirring means because of backlash in the associated drive apparatus. On startup of the next shirring cycle, the feed rolls start rotating immediately prior to the rotation of the shirring means and this time differential in rotation of the feed and shirring means accentuates a tendency to buckle the uninflated casing intermediate the rolls. Trouble-free startup to establish the shirring action requires that the unshirred casing be inflated and advanced concentrically over the mandrel by the feed rolls as a rigid cylinder through the shirring passage. The casing cannot be fully inflated until the severed end of the unshirred casing is advanced to abut the surface of the holdback arm and thereby establish an air seal at the leading end of the casing. Fold or crease flaws in the casing wall or slack in the unshirred strand weakens the uninflated casing as a rigid member and the desired air seal may not be established and consequently, the pleating action of shirring is not re-established at the startup. If an air seal is made in folded or creased casing, such casing also may not have sufficient strength as a rigid member to establish the shirring action.

A chain drive and sprocket arrangement is provided for driving the shirring means, which permits movement of the shirring head along the drive chain. Thus, when the drive chain is halted (between shirring cycles), and the shirring head retracted and advanced, the shirring passage is displaced by relative movement of the shirring head drive sprocket and the stationary chain. For optimum results, to insure crease-free casing and trouble-free pleating at each startup, the drive sprocket pitch diameter must be larger than the pitch diameter of components establishing the shirring passage.

Thus, on advancing the shirring head, the shirring components which form the passage gripping the casing, tend to skid the shirring passage along the casing and thus remove any folds, creases or slack which may exist in the unshirred strand. This also compensates for startup backlash between the metering rolls and shirring means.

To automatically transfer the severed shirred casing on the mandrel, from the shirring zone to and through spaced compression stations and a doffing station, tandem spaced gripping members which engage to encircle the mandrel, are affixed to a movable holdback arm which separates the severed trailing end of the previously shirred piece from the leading end of the casing next to be shirred. The spaced gripping members of the holdback arm initially control the advance of the pieces of shirred casings along the mandrel. Later in the cycle when the holdback arm has been completely advanced, a cooperating transfer arm is indexed between the spaced gripping members of the holdback arm. Thus, control of movement of the previously shirred piece of casing is transferred from the gripping members of the holdback arm to the gripping member of the transfer arm for successive indexing of the casing to spaced compressing and doffing stations.

The transfer arm and the partly-compressed casing are moved rapidly through a first mandrel clamp to a compressing station on the mandrel where auxiliary compressing power is transmitted to the transfer arm, to highly-compress the partly-compressed casing against the adjacent surface of a second clamp.

A doffing device is arranged with a separate mandrel aligned to receive the highly-compressed piece of casing advanced from the shirring mandrel. A separate retention means cooperates with the doffing mandrel, retaining the casing and preventing it from expanding beyond a specific length. An attendant may, by remote control, rotate the doffing unit out of alignment with the shirring mandrel; the compressed casing being then released from the retention means for removal to the shipping package.

Figure 1:
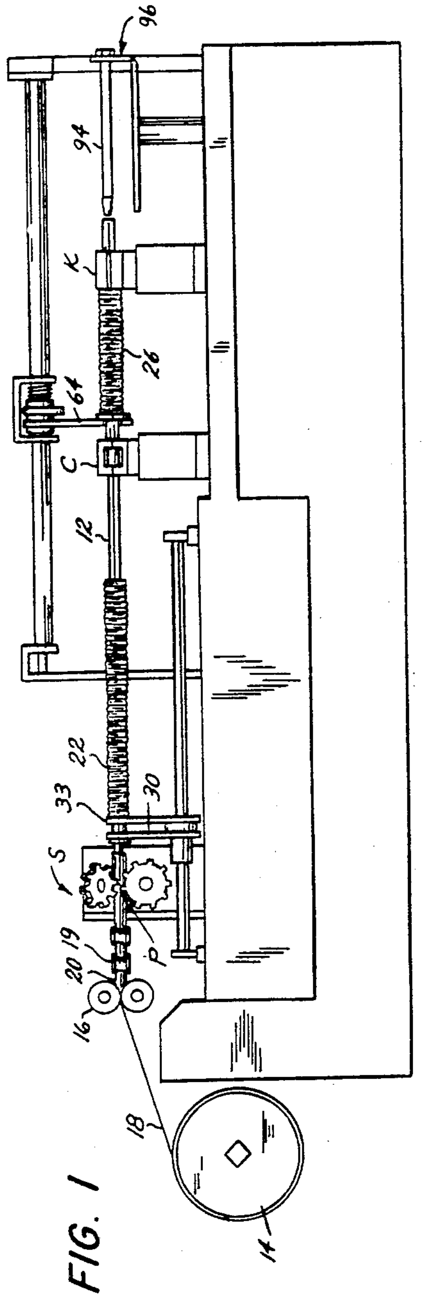
FIG. 1 is a diagrammatic side elevation of a shirring apparatus, showing the preferred embodiment of the present invention.
Figure 2:
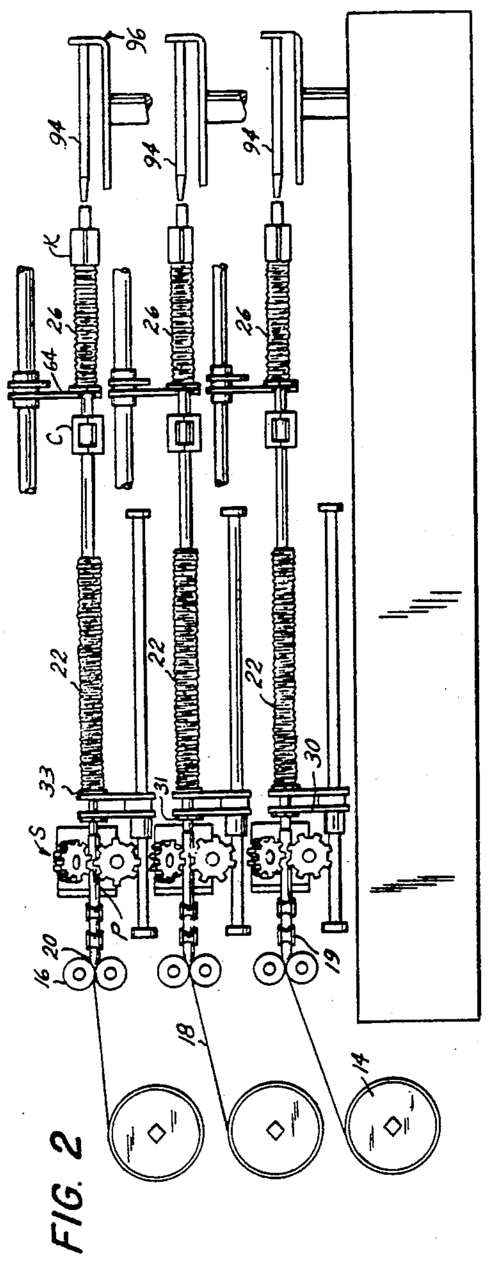
FIG. 2 is a diagrammatic side elevation of a modified three-mandrel shirring apparatus.
Figure 4:
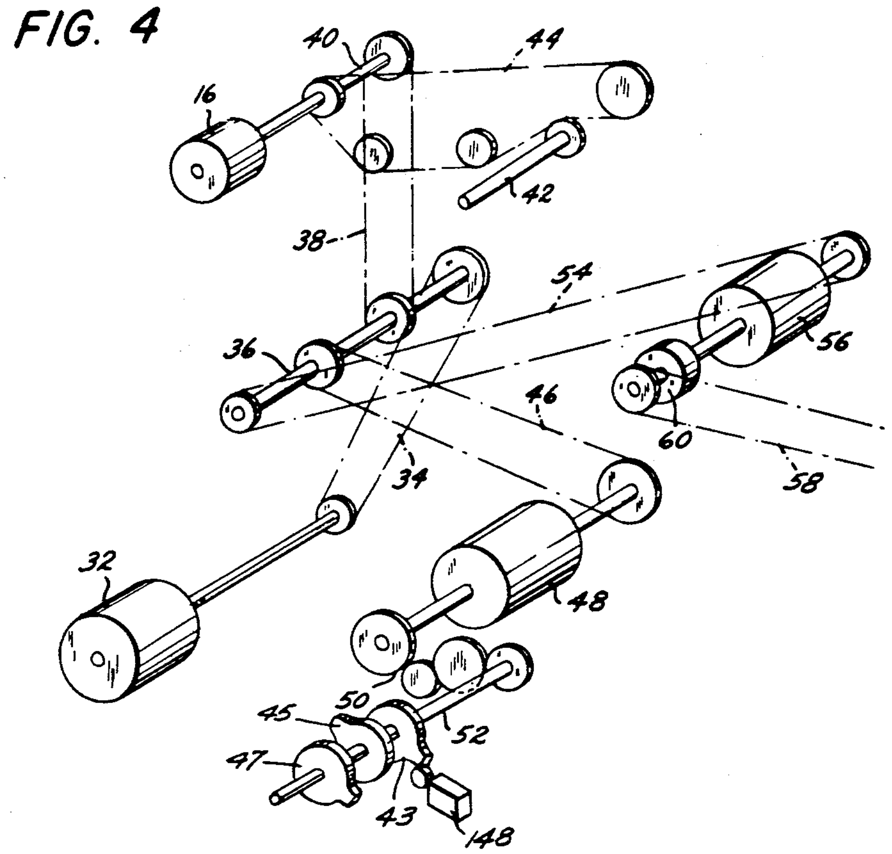
FIG. 4 is a perspective of the principal drive elements.
Figure 5:
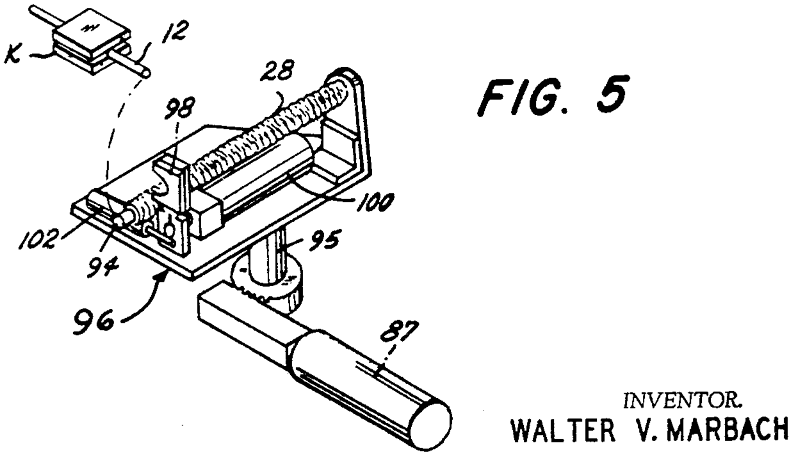
Figure 4A:
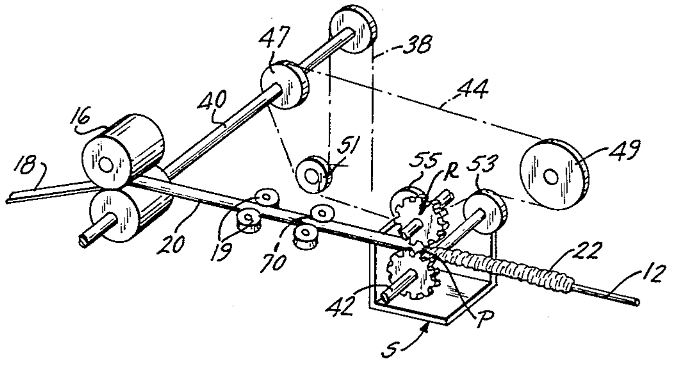
Figure 4B:
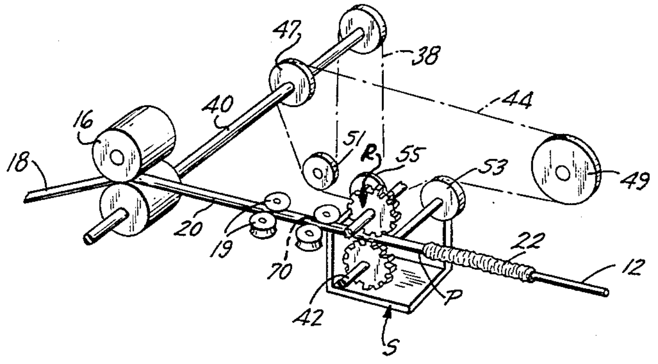
Figure 6:
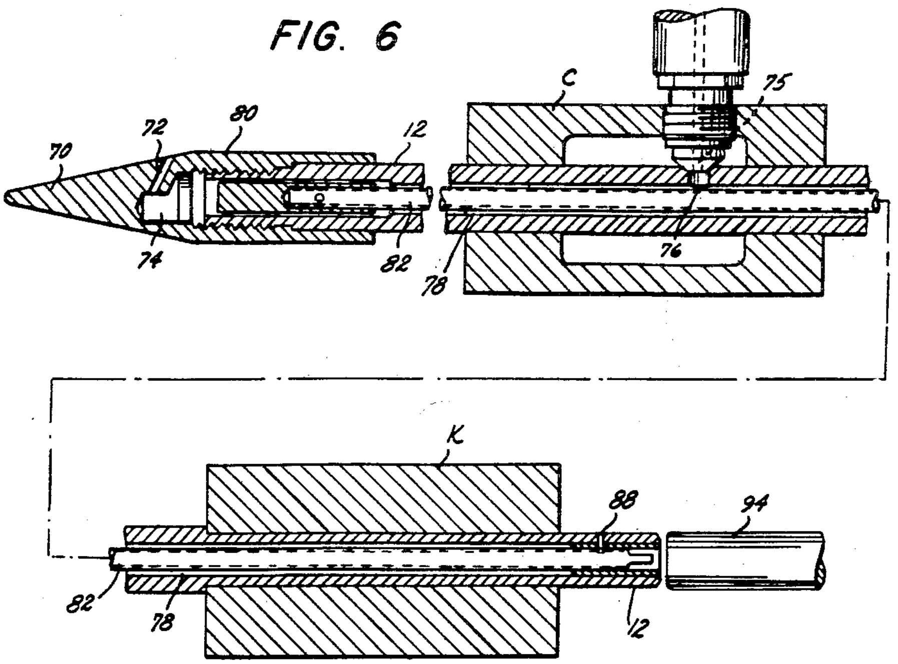
Figure 7:
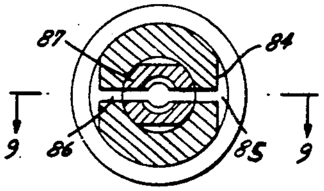
Figures 8, 9:
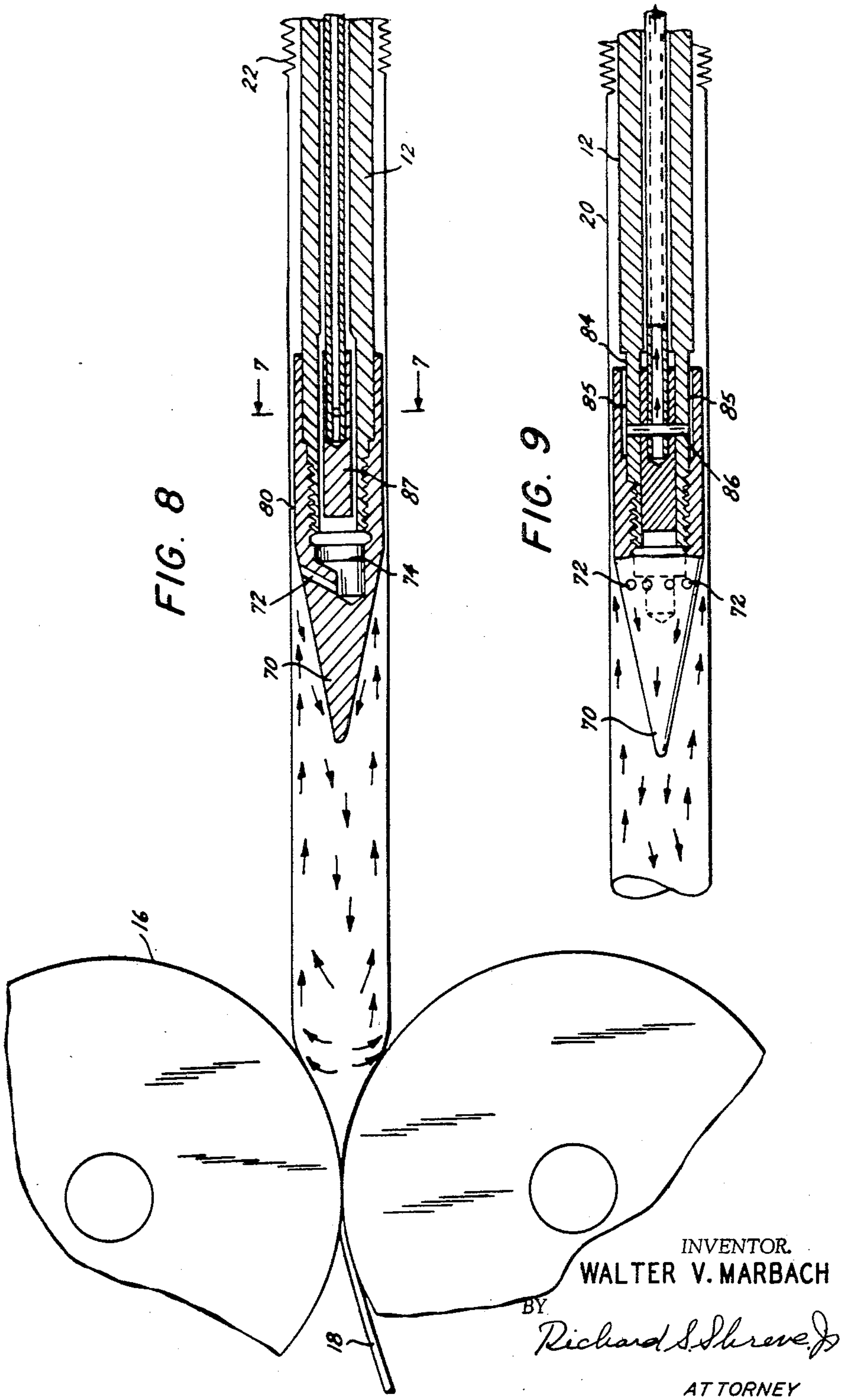
Figure 10:
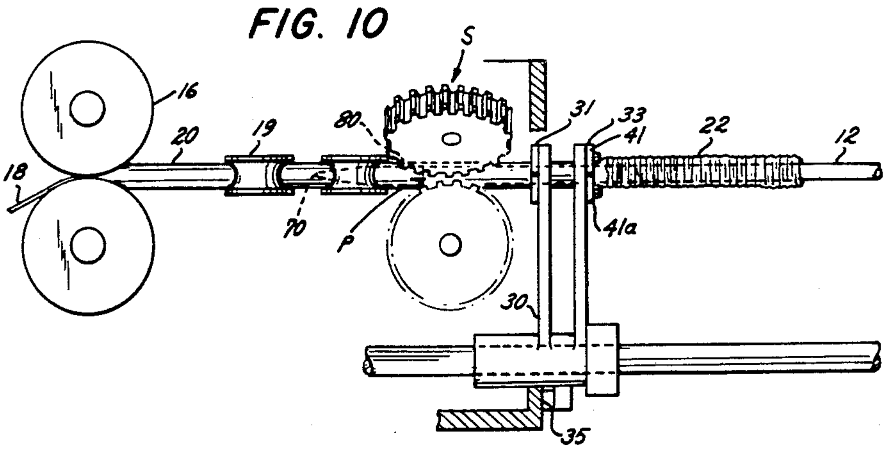
Figure 11:
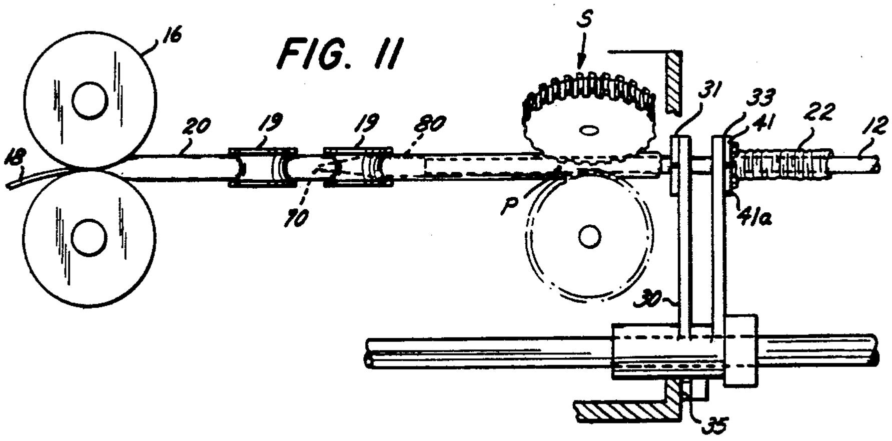
Figure 12:
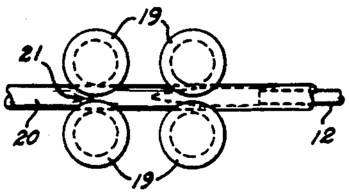
Figure 14:
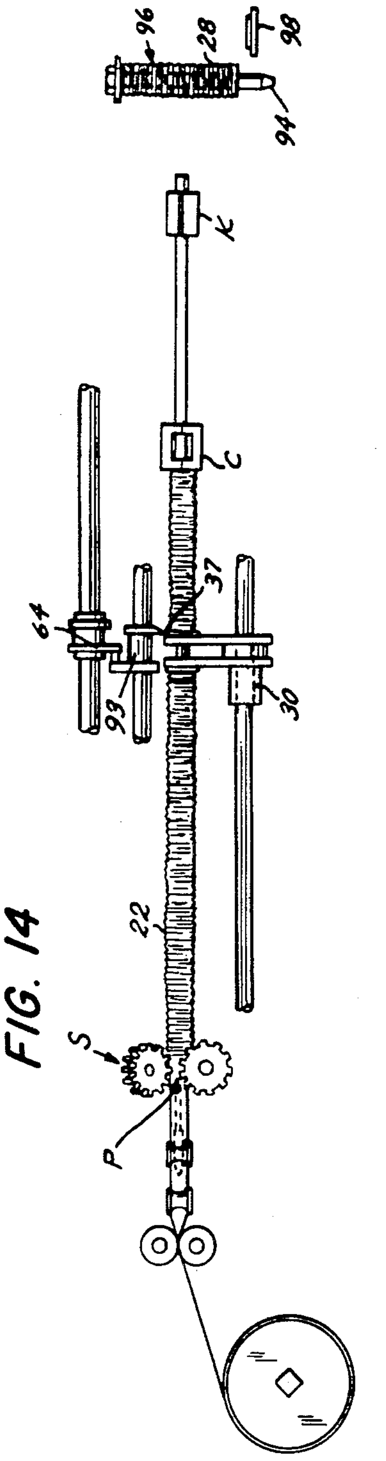
Figure 13:
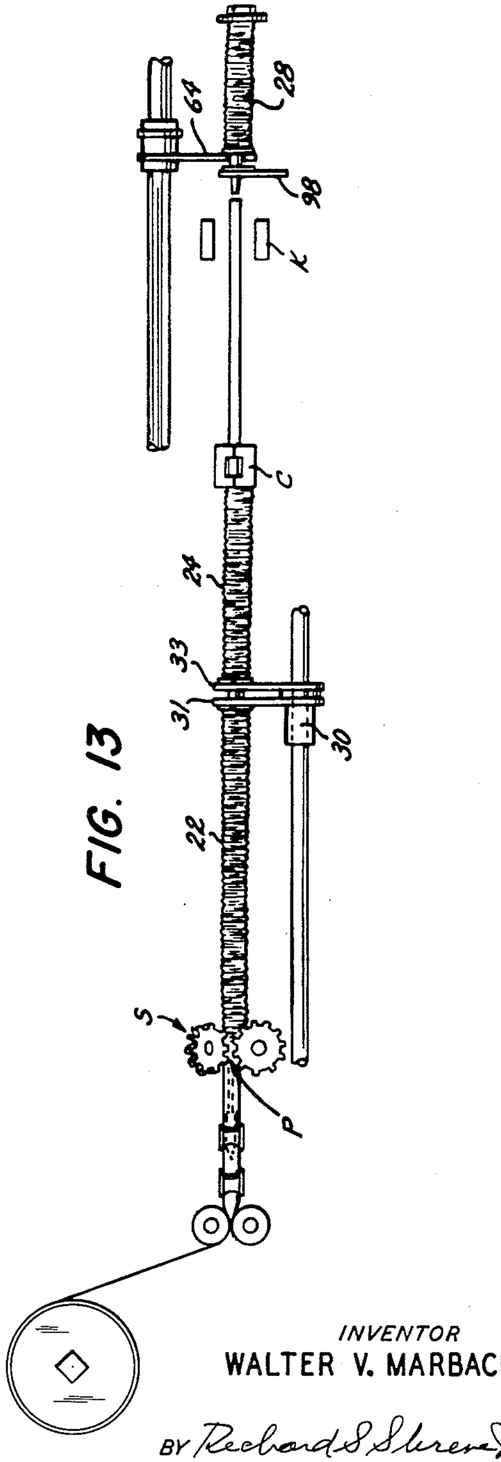
Figure 15:
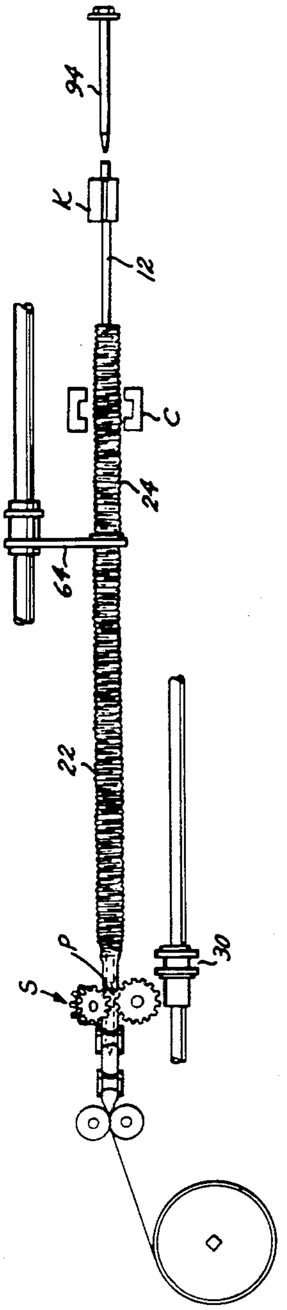
Figure 17:
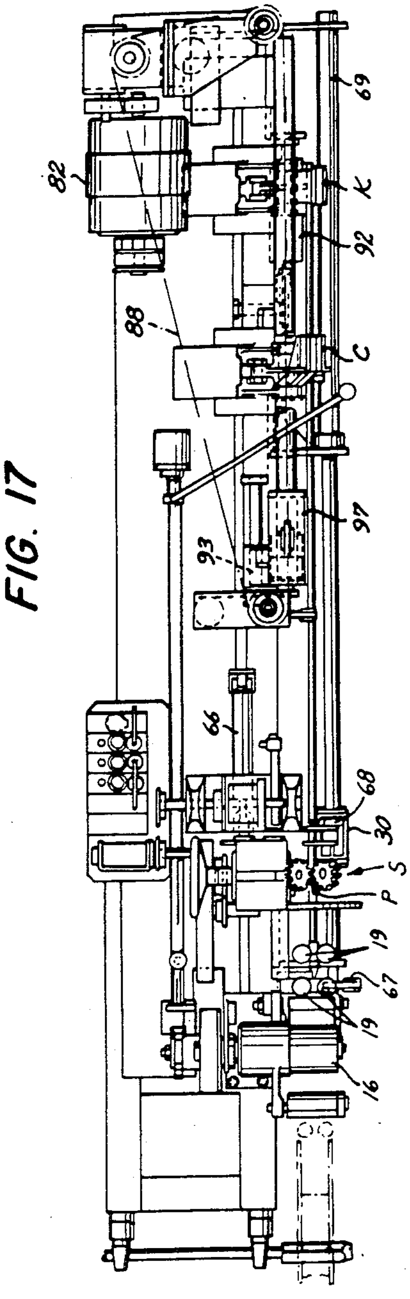
Figure 16:
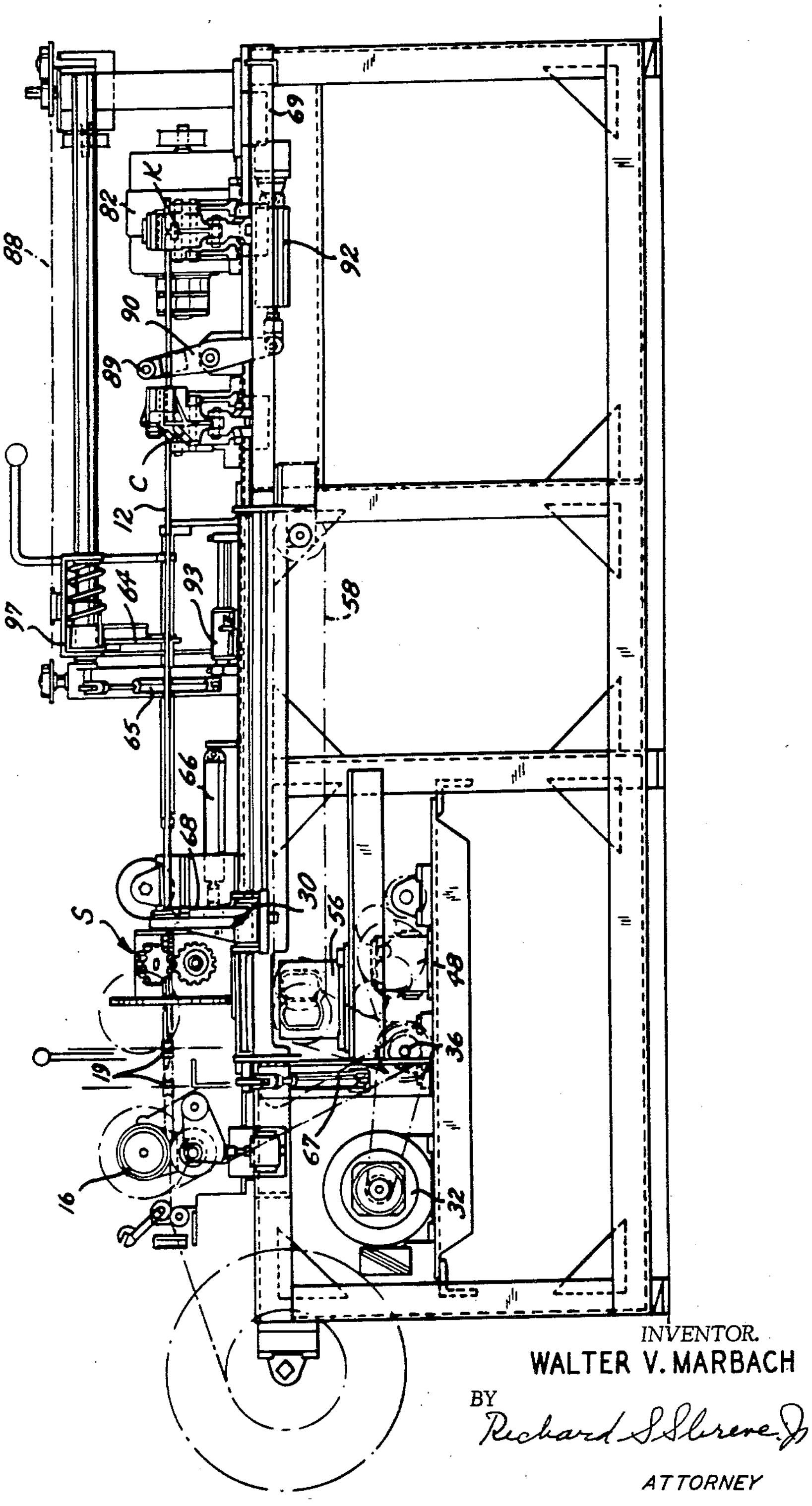
Figure 18:
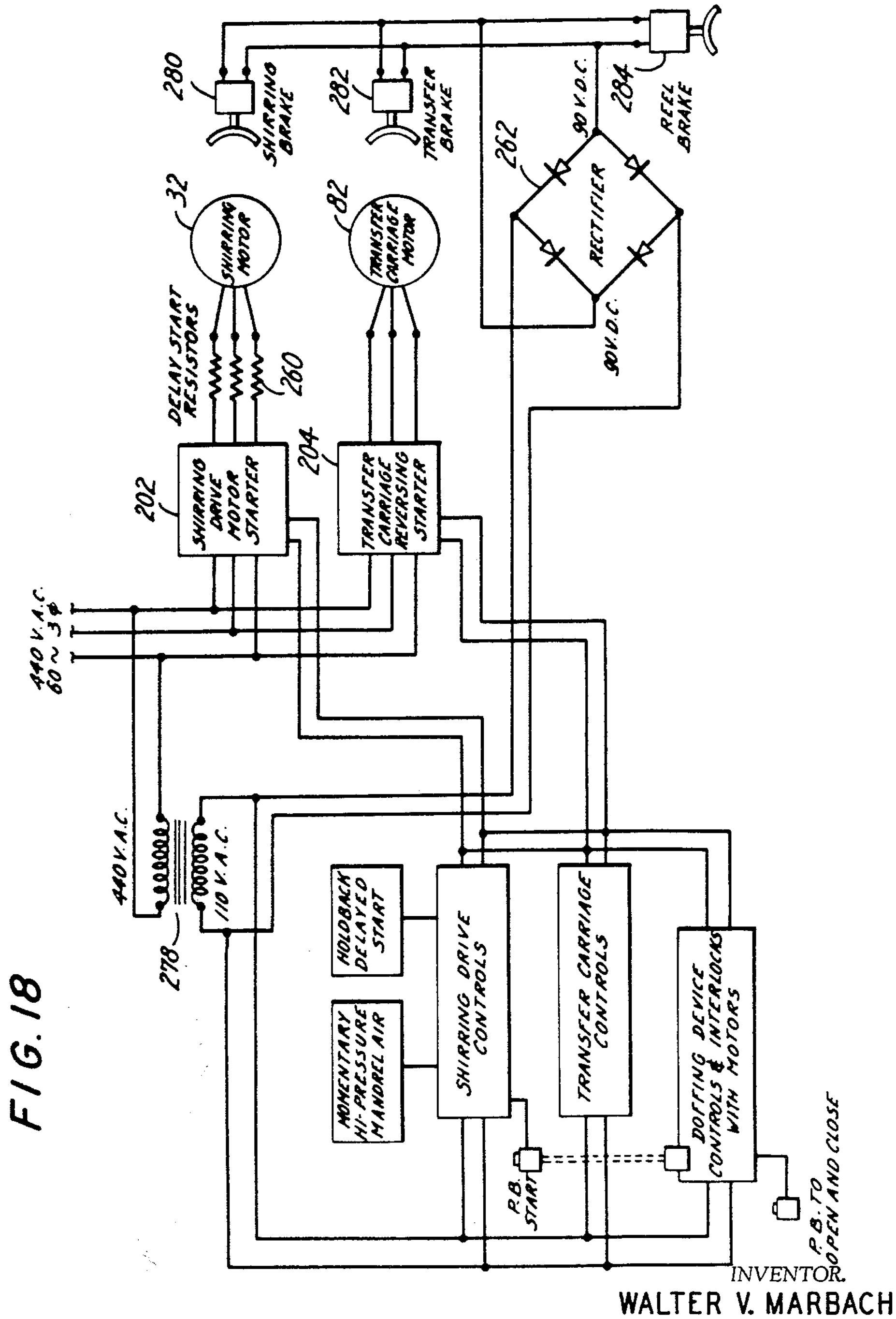
Figure 19:
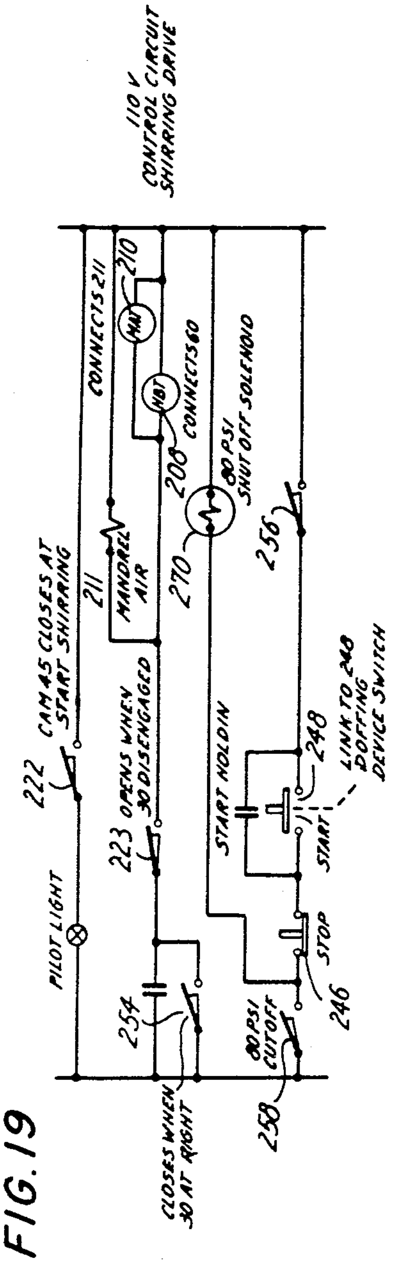
Figure 20:
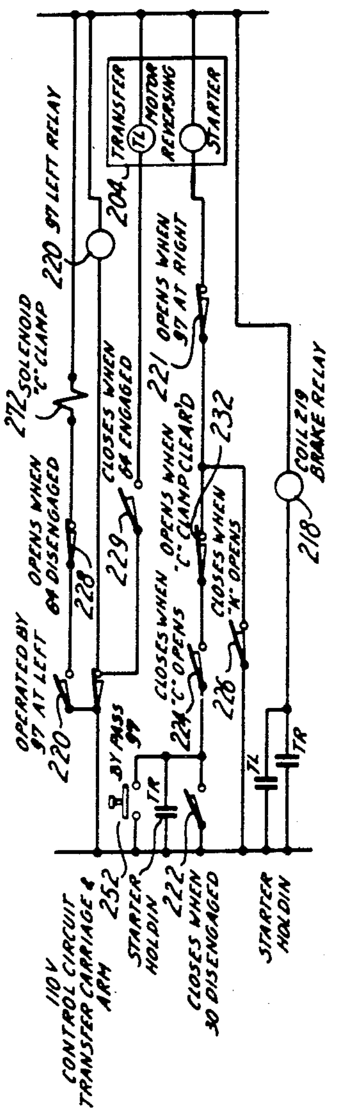
Figure 21:
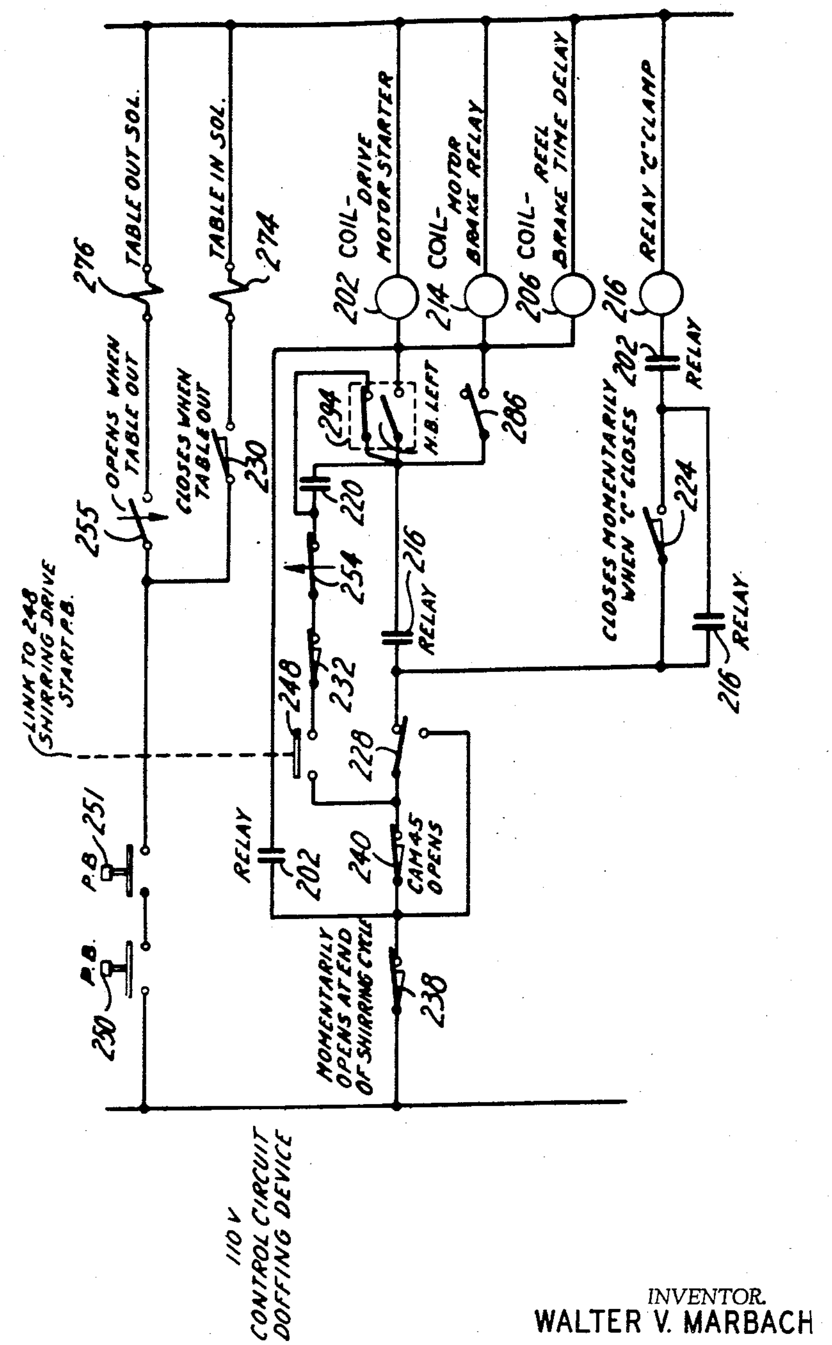
Figure 22:
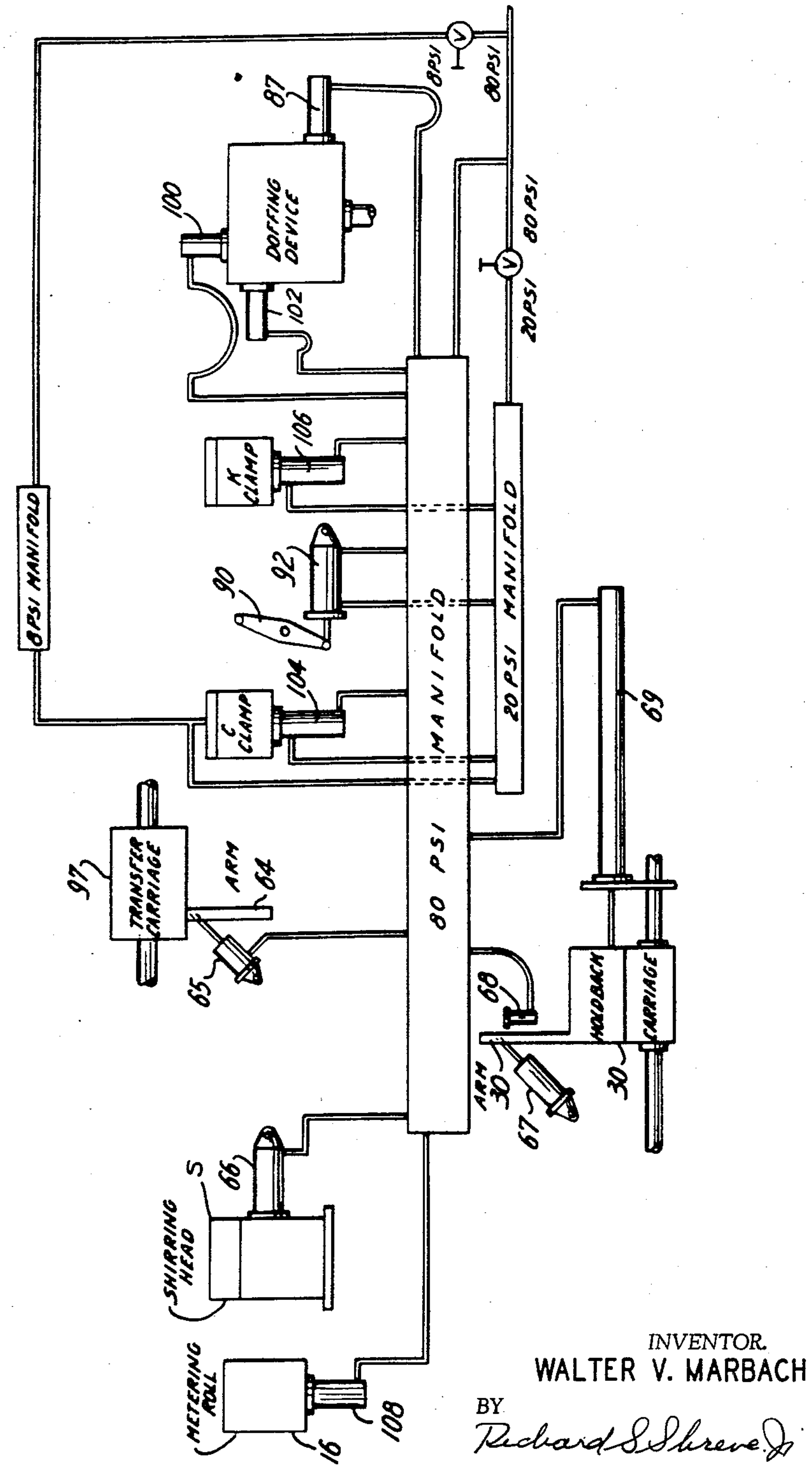
Figure 23:
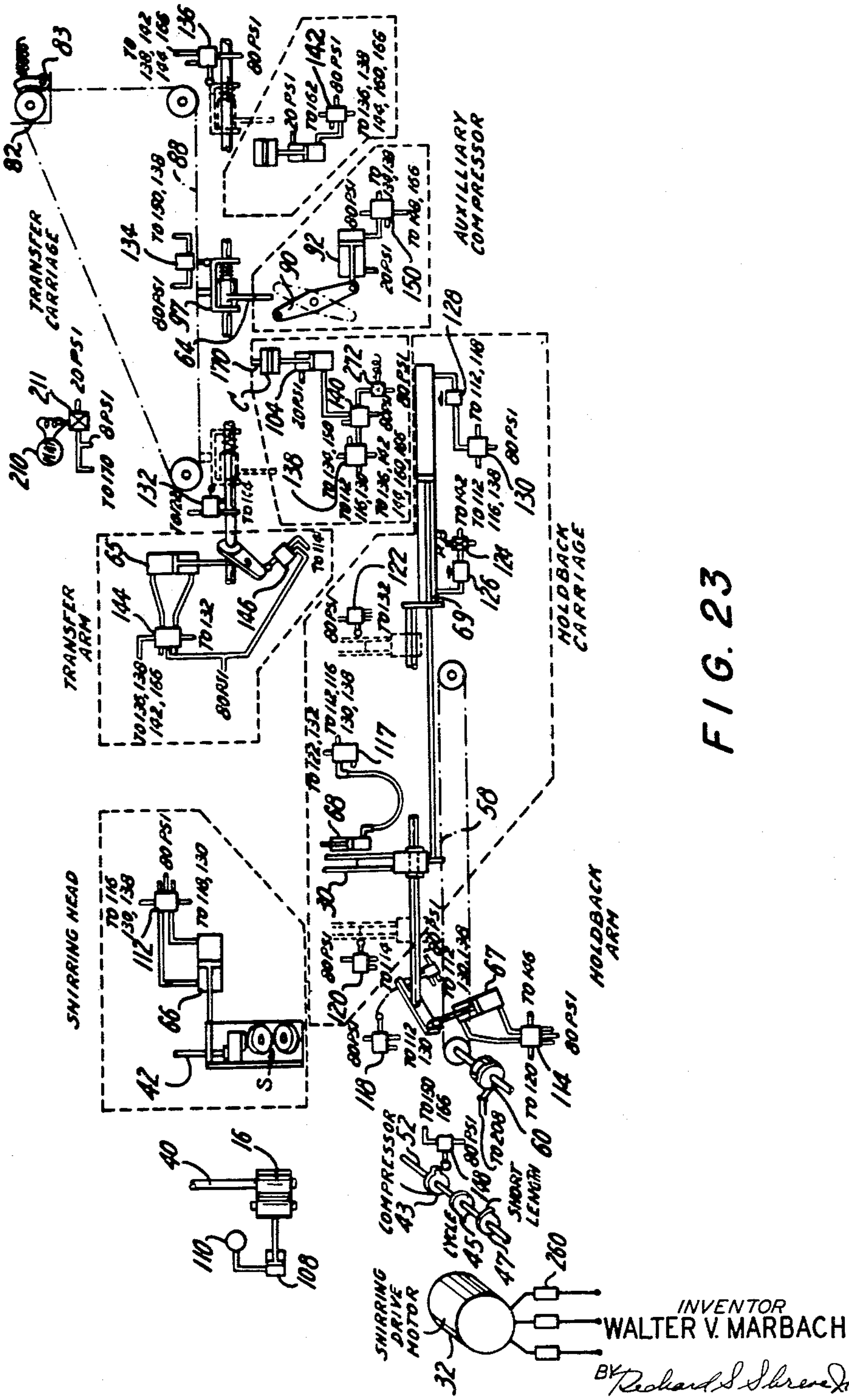
Figure 24:
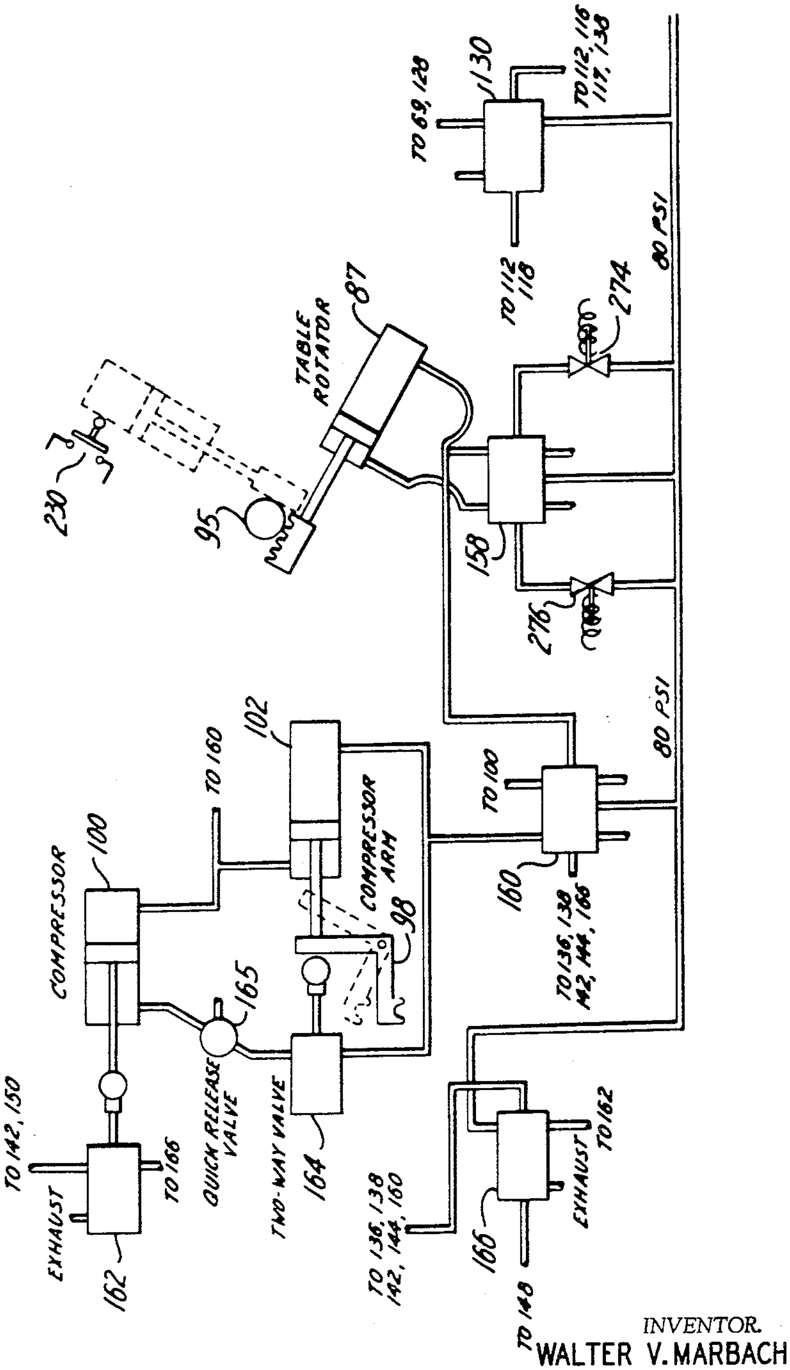

FIG. 4*a* is a perspective of a portion of a shirring apparatus showing feed rolls, zone of shirring and a portion of the principal drive elements;

FIG. 4*b* is a perspective view similar to FIG. 1, with the shirring head retracted from the zone of shirring;

FIG. 5 is a perspective of the doffing device in a position for removal of finished casing;

FIG. 6 is an axial sectional view of portions of the shirring mandrel gripped in the shirring machine clamps;

FIG. 7 is an enlarged sectional view of shirring mandrel 12 along line 7—7 of FIG. 8;

FIG. 8 is a transverse section of the entry end of the shirring mandrel;

FIG. 9 is a top sectional view of shirring mandrel 12 taken along line 9—9 of FIG. 7;

FIG. 10 is an enlarged diagrammatic side elevation of the shirring head and holdback arm in retracted position and unshirred casing exposed;

FIG. 11 is an enlarged diagrammatic side elevation of the shirring head in advance position, and the unshirred casing severed;

FIG. 12 is a diagrammatic plan of a portion of FIG. 11;

FIGS. 13, 14 and 15 are diagrammatic side elevations of components at successive stages of the shirring and compressing cycle;

FIG. 13 at 64 percent of the machine cycle;

FIG. 14 at 80 percent of the machine cycle;

FIG. 15 at 90 percent of the machine cycle;

FIG. 16 is a side elevation of a general assembly of the machine;

FIG. 17 is a plan of the machine shown in FIG. 16;

FIG. 18 illustrates, in block diagram, the electrical conduits which can be employed for the automatic shirring machine shown in the preceding figures of the drawings;

FIG. 19 illustrates diagrammatically the electrical circuits for controlling the shirring motor and associated operations shown in FIG. 18;

FIG. 20 illustrates diagrammatically the electrical circuits for controlling the transfer carriage motor and associated operations shown in FIG. 18;

FIG. 21 illustrates diagramamtically the electrical circuits for controlling the doffing device and associated interlocks with the motor controls of FIGS. 19, 20;

FIG. 22 illustrates, in block diagram, the pneumatic circuits which can be employed for the automatic shirring machine shown in the preceding figures of the drawings;

FIG. 23 illustrates diagrammatically the pneumatic circuits for controlling the shirring head, holdback carriage, transfer carriage and auxiliary compressor shown in FIG. 22; and FIG. 24 illustrates diagrammatically the pneumatic circuits for controlling the doffing device shown in FIG. 22.

As shown in FIG. 1, a supply of flattened tubing, such as cellulosic tubing 18, is intermittently withdrawn from a supply reel 14 in measured lengths, such as 40 ft., 44 ft. and 55 ft. by a pair of horizontally journaled metering rolls 16. The flattened tubing 18 is advanced through metering rolls 16, expanded to inflated tubing 20 as by gaseous means, and by means of a plurality of pairs of annular grooved rolls 19 is aligned centrally onto hollow mandrel 12 to and through zone of shirring S.

The leading end of the mandrel 12 has cylindroconical tip 70 (FIG. 6) positioned at about 55 percent the distance from shirring passage P to the nip of metering rolls 16. Two pairs of annular grooved rolls 19, as more particularly shown in FIG. 12, are arranged in tandem to provide spaced circular passages 21 which support the casing around its circumference and align it central to mandrel 12. The passages formed by the pairs of annular grooved rolls 19, as more particularly shown in FIG. 10, are spaced to grip and support about 20 percent of the casing span intermediate the metering rolls 16 and the shirring passage P. Circular passages 21 thus prevent the wandering of casing caused by telescoped or non-flat supply reels of casing.

Optimum guidance for casing 20 onto mandrel 12, as more particularly shown in FIGS. 6, 7, 8 and 9, is provided by making cylindrical portion 80 of the tip of a diameter at least 0.020 inch less than the minimum inside diameter of inflated casing 20. Tip 70 of mandrel 12 supplies the gaseous inflating means to casing 20 through a plurality of holes 72 bored in the upper portion of the cone and connected to internal chamber 74. The gaseous means which, for example, may be air under pressure of about 6 p.s.i. during shirring, is momentarily increased to a pressure of about 18 p.s.i. at the start of the shirring when metering rolls 16 start advancing casing 18 to inflate, stiffen and advance the leading open end of unshirred inflated casing 20 to the adjacent surface of holdback arm 31 whereby the air is sealed into the casing and pleating of the casing is started. The momentary increase in mandrel air pressure at the start of the shirring cycle is accomplished by actuating an electrical time-delay relay 210 as shown on FIG. 19, which operatively connects valve 211 as shown on FIG. 23, thereby connecting the normal 8 p.s.i. of mandrel air supply to a source of 20 p.s.i. air.

Air is supplied from any convenient source to bore 78 of mandrel 12, as by internal passage 75 through clamp C communicating with bore 78 through radial opening 76 in the mandrel wall. The air is led to chamber 74 and by holes 72 to inflate casing 20. An oversupply of lubricated air is provided to lubricate the mandrel. The circulating air advances along the cylindrical portion 80 of the tip and is additionally used to center and advance casing 20 to the shirring passage P. The oversupply of air is vented to an interior tube 82 central of mandrel bore 78, by means of passage 85 made by flats 84 on mandrel 12 and by radial holes 86 bored through the mandrel and plug 87. The air then advances along tube 82 to an exit orifice 88 positioned in advance of clamp K.

Referring now to FIG. 4 and to the electrical block diagram FIG. 18, main drive motor 32 is intermittently operated during each shirring cycle by the control circuit shown on FIG. 19 to drive jackshaft 36 to timing belt drive 34. Acceleration of motor 32 is delayed at the start of each shirring cycle by delay start resistors 250. A delay of at least two seconds for the motor to reach full speed, enables the means described above to advance the leading end of casing 20 to and through the shirring passage P and seal it against the holdback surface 31 without jamming the casing on mandrel 12.

Jackshaft 36 drives metering rolls 16 through timing belt drive 38 and shaft 40. Shaft 40, in turn, drives shirring head drive 42 through chain drive 44. Jackshaft 36 also drives cam shaft 52 through timing belt drive 46 and speed reducer 48 and change gear train 50. Cam shaft 52 makes one revolution per machine cycle. The length of casing drawn into each machine cycle by metering rolls 16 is adjusted by changing the ratio of the drives between metering rolls 16 and cam shaft 52. Referring now to FIG. 23, cam shaft 52 mounts the cycle cam 45, short length cam 47 and auxiliary compressor cam 43. Cycle cam 45 determines length of casing shirred, by halting shirring motor 32 when a predetermined length has been advanced through the metering rolls. Short length cam 47 permits declutching of the shirring head and metering rolls 16 to finish out a cycle when a splice, or short length in the casing supply occurs. Compression cam 43 operates to trip compressor cam pilot valve 148 which actuates doffing device interlock valve 166 (FIG. 24), which in turn, actuates valve 142 to operate pneumatic cylinder 106 opening clamp "K," and also actuates valve 150 to operate pneumtaic cylinder 92 thereby retracting compressor arm 90. This operation predetermines the length of time casing 26 is under high compression.

Jackshaft 36 also drives the holdback arm 30 (FIG. 3) through timing belt drive 54, speed reducer 56 and chain drive 58; thus controlling the advance of shirred casing 22 from the zone of shirring S. At termination of the shirring cycle, electrically operated clutch 60 is de-energized which thereby disconnects holdback chain drive 58 from reducer 56, thus permitting holdback arm 30 to be returned by air cylinder 69 to zone of shirring S. At start of the shirring cycle, electrical time delay relay 208 (FIG. 19) holds the circuit open momentarily, and thus clutch 60 is not immediately operatively connected to the holdback chain drive 58. This delay momentarily halts movement of the holdback arm 30 and allows an amount of the casing at startup to be shirred against holdback fork 31 to a shirred density approximately that of the remainder of the shirred length of casing.

Figure 3:
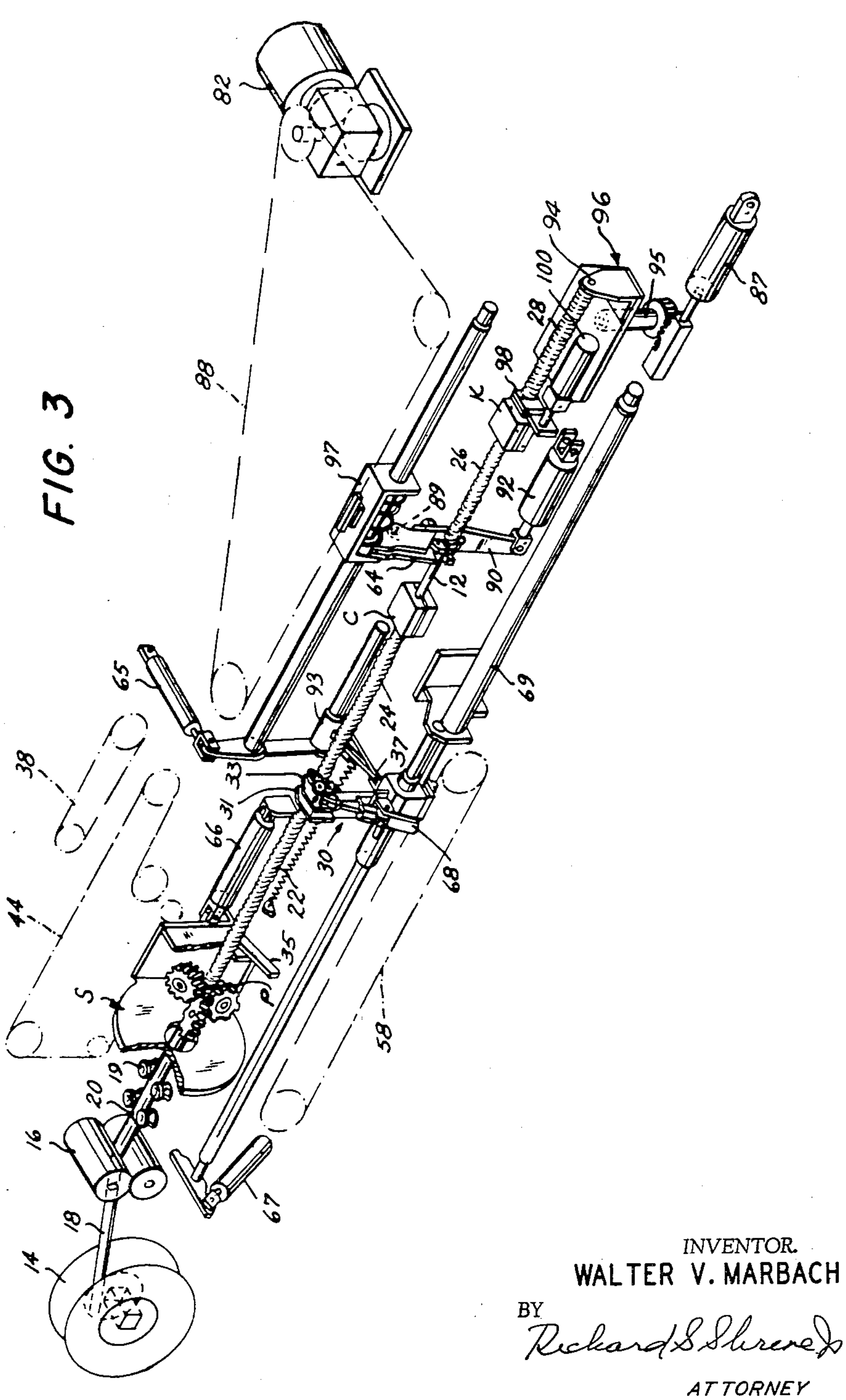
FIG. 3 is a perspective of the upper portion of a shirring apparatus shown in FIG. 1 and showing a mandrel positioned in a central passage of the shirring means.

As shown in FIG. 3, the desired length of inflated casing is loosely shirred by a suitable shirring means S, including those described in copending Matecki application Serial No. 744,444, now Patent No. 2,943,770, and Patents Nos. 2,983,949 and 2,984,574, against the forked surface 31 on cooperatively yielding holdback arm 30. Referring now to FIG. 10, holdback arm 30 has a holdback fork 31 and powered gripping jaws 33 forming tandem spaced surfaces, each of which encircle and grip the mandrel and separate the loosely shirred casing 22 from firmly-compressed casing 24 previously shirred. The gripping jaws on fork 31 are pivoted and spring-loaded to the closed position. Initial engagement of the gripping jaws with the mandrel spreads the jaws and then the spring action causes them to encircle and grip the mandrel. Shortly after the shirring means starts to operate, the holdback arm 30 is advanced at a specific rate by holdback chain drive 58. This restricts the advance of the loosely shirred casing 22 from the zone of shirring S; provides about a 1/25 length reduction in the casing and firmly-compresses previously shirred casing 24 against the adjacent surface of clamp "C."

During the shirring operation, holdback arm 30 is advanced by chain drive 58 to control the shirred density of casing stick 22 and partly-compressed stick 24. When the desired length of casing, such as 55 ft., has been pleated as loosely shirred casing 22, cycle cam 45 opens cycle stop switch 238 (FIG. 21), thereby de-energizing shirring drive starter 202, motor 32 and energizing brake 280 through motor brake relay 214.

Shaft 40 also mounts sprocket 47 which drives roller chain 44 about idler sprockets 49, 51. Roller chain 44 also engages shirring drive sprocket 53 and idler sprocket 55, both of which are mounted on shirring head S.

During the shirring cycle, a measured amount of inflated casing 20 is fed onto the mandrel 12 by operation of shaft 40 driving feed rolls 16, and such casing is concurrently shirred in the shirring passage P by action of typical shirring means S, also driven by shaft 40 through roller chain 44. When the desired measured amount of casing 22 has been shirred, rotation of shaft 40 is stopped. Shirring head S is movable along the axis of mandrel 12 and is then retracted to permit severing the casing 22 at the terminal shirred pleat. Movement of the shirring head S to retract it from and advance it to the zone of shirring P, causes sprocket 53 of shaft 42 to rotate along the halted chain 44. FIG. 4*a* shows the shirring head S in advance position for the shirring operation.

FIG. 4*b* shows the typical shirring head S retracted from the shirring zone P for severing the casing. The shirring head S is retracted when chain drive 44 is inoperative and, as a consequence, shirring means R rotate from the relative movement of sprocket 53 of shaft 42 along chain 44.

Backlash in the drive between the metering rolls 16 and shirring means, may tend to cause the metering rolls 16 to start first and thereby introduce slack and folds or creases in the casing therebetween. This would adversely affect the next cycle startup. However, by providing the sprocket 53 of shaft 42 with a pitch diameter larger than the pitch diameter of components establishing the shirring passage P, the advance of the shirring head S will cause the shirring passage P to advance relative to the surface of the casing 20 and maintain the unshirred strand free from slack or creases, thus ensuring trouble-free startup of the succeeding shirring cycle.

Referring particularly to FIG. 23, when shirring stops, holdback arm 30 has been advanced fully to engage pneumatic valve 122 which triggers a sequence of interlocked pneumatically controlled operations. Transfer arm 64 has been previously retracted and indexed as later described, opposite holdback arm 30.

When both holdback right pilot valve 122 and transfer device left pilot valve 132 have been actuated, valve 144 operates pneumatic cylinder 65 to swing transfer arm 64 into engagement with mandrel 12, between spaced surfaces 31 and 33 of the holdback arm 30. Cycle limit switch 238 causes solenoid operated valve 272 to close, thereby venting 80 p.s.i. air from pneumatic cylinder 104 and thus causing "C" clamp to open. This occurs only when "left" limit switch 220 has been actuated by contact of transfer carriage 97, and transfer arm 64 has engaged "arm-in" valve 146. Actuation of transfer "arm-in" valve 146 actuates holdback arm valve 114 to operate pneumatic cylinder 67, thereby causing holdback arm 30 to disengage from mandrel 12.

When transfer arm 64 is engaged with mandrel 12 and pneumatic cylinder 67 swings holdback arm 30 out of engagement with the mandrel, the trailing end of casing 24 is transferred to the leading surface of transfer arm 64. The leading surface of arm 64 mounts gripping members which are spring-loaded to be held open when not engaged by the mandrel, and are thus arranged always to accept mandrel 12 at engagement.

Actuation of holdback "arm-out" pilot valve 118 (FIG. 23) and limit switch 222 (FIG. 20), which closes when holdback arm 30 disengages the mandrel, thereby causes pilot valve 112 to operate pneumatic cylinder 66 thereby retracting shirring head S, pilot valve 130 to actuate valve 128 to operate pneumatic cylinder 69 thereby retracting holdback arm 30 to the left to contact pilot valve 120, transfer motor 82 and drive 88 to advance transfer carriage 97 to the right, if "C" clamp limit switch 224 is closed and "C clamp-cleared" switch 232 is opened.

When holdback left pilot valve 120 is actuated by holdback arm 30 reaching its retracted, leftmost position, it actuates valve 114 to operate pneumatic cylinder 67 to swing holdback arm 30 into engagemnet with mandrel 12; which, in turn, actuates holdback "arm-in" pilot valve 116. When valve 116 is actuated, it causes valve 112 to operate pneumatic cylinder 66 advancing shirring head S to the right, thereby contacting at 35 and advancing holdback arm 30 and exhausing holdback cylinder 69; and "C" clamp pilot valve 138 to actuate valve 140 and operate pneumatic cylinder 104 to close clamp "C," if transfer carriage 97 has tripped "C clamp-cleared" pilot valve 134.

Shirring head S is arranged to be advanced and retracted parallel to mandrel 12. In the retracted position, the shirring head is disengaged from the terminus of the shirred casing, thereby enabling pneumatic cylinder 67 to swing the holdback arm 30 into engagement with mandrel 12 behind the said terminus. The advanced gripping member 33 of holdback arm 30 is comprised of pivoted plate jaws 41, 41*a* mounting mating gear segments which are actuated by pneumatic cylinder 68. Upon engagement with mandrel 12, the gripping jaws 41, 41*a* firmly encircle and grip casing 20, thus segregating the loosely shirred portion 22 from unshirred casing 20. The holdback "arm-in" pilot valve 116 actuates valve 117 which operates pneumatic cylinder 68 to close the pivoted gripping jaws 33 firmly about mandrel 12.

Continuing in the sequence of electro-pneumatic operations described above, and referring also to FIG. 11, holdback arm 30 is advanced by the shirring head S to a position in advance of the shirring passage P. The advanced gripping member 33 of holdback arm 30 grips the encircled portion of unshirred casing 20 and advances and thereby tensions the casing between the gripping means and the halted metering rolls 16. This serves the casing at the leading edge of the grip 33, thereby separating the metered shirred length 22 from unshirred casing 20.

Meanwhile, in the sequence of operations described above and referring again to FIG. 3, clamp "C" has been opened, whereupon the transfer arm 64 and casing 24 are advanced along mandrel 12 to and through clamp "C" by chain drive 88 operated by motor 82. Clamp "C" is closed by transfer carriage 97 actuating pilot valve 134 (FIG. 23) and another shirring cycle is started by the following controls. When clamp "C" is closed, it trips limit switch 224 (FIG. 20) which causes the shirring cycle to start if holdback arm 30 is in start position sensed by limit switch 294 (FIG. 21), and causes time delay relay 208 (FIG. 19) controlling clutch 60 to start functioning.

As transfer carriage 97 advances, arm 64 on mandrel 12, it trips "C clamp-cleared" pilot valve 134 and "clamp-cleared" switch 232 which causes transfer carriage motor starter 204 to be de-energized and motor 82 to be stopped by energizing brake 282, actuates "C" clamp interlock valve 138 to actuate valve 140 operating pneumatic cylinder 104 to close "C" clamp, actuates compressor valve 150 operating pneumatic cylinder 92 to cause compressor arm 90 to engage transfer arm 64 thereby to tightly compress casing stick 26 against the adjacent surface of closed clamp "K."

After the machine has gone through about 60 percent of the complete operation cycle, compressor cam 43 actuates the control sequence noted above, which retracts compressor arm 90 from contact with transfer arm 64, and opens clamp "K." When clamp "K" opens, switch 226 energizes starter 204 in advancing direction and de-energizes brake 282 and causes motor 82 to advance transfer carriage 97 to and through clamp "K." Transfer arm 64 thereby pushes tightly-compressed casing 28 from the advance end of mandrel 12 onto doffing mandrel 94 (FIG. 5) of rotatably mounted doffing unit 96 which, during this operation, is aligned with shirring mandrel 12.

When transfer carriage 97 reaches its rightmost position, it contacts pilot valve 136 and right limit switch 221 which causes transfer carriage motor starter 204 to be de-energized and motor 82 to be stopped by energizing brake 282, actuates valve 144 operating pneumatic cylinder 65 to disengage transfer arm 64 from the mandrel 12 and out of contact with pilot valve 146, actuates valve 142 operating pneumatic cylinder 106 to close clamp "K," exhaust doffing device interlock valve 166 (FIG. 24) and "C" clamp interlock valve 138.

When transfer arm 64 disengages mandrel 12, it actuates "arm-out" limit switch 222 which causes transfer carriage motor starter 204 to be energized in retracting direction, de-energizes brake 282 thereby causing motor 82 to retract transfer carriage 97 to the leftmost position, actuating "left" limit switch 220 and pilot valve 132. This, in turn, causes transfer carriage drive to become de-energized by limit switch 220 and at this station, transfer arm 64 is indexed with advancing holdback arm 30. Transfer arm 64 is slidably engaged with spring-loaded carriage 97 by coil spring 99 which yields when carriage 97 is retracted beyond the indexing position where transfer arm 64 engages indexing carriage 93. Indexing carriage 93 has previously been advanced to the indexing position by contact at 37 with advanced holdback arm 30. This indexing action aligns the retracting transfer arm 64 with advancing holdback arm 30 and thus, in the control sequence already described, permits transfer arm 64 to swing into engagement with mandrel 12 intermediate the spaced surfaces of advancing holdback arm 30 also engaged with mandrel 12. Transfer arm 64 engages mandrel 12 immediately after the shirring cycle has been completed.

Operations of the rotatably mounted doffing unit 96 are electro-pneumatically interlocked with the shirring, compressing operations by control circuits shown on FIGS. 21, 24. When, as described above, transfer arm 64 has advanced to its rightmost position and thereby advancing a fully compressed casing stick 28 onto doffing mandrel 94, it contacts pilot valve 136 which, in turn, actuates doffing device interlock valve 166. Actuation of valve 166 in turn actuates valve 144 which disengages transfer arm 64 from mandrel 94. At the same time, valve 166 actuates valve 160 which operates pneumatic cylinder 102, swinging compressor arm 98 into engagement with doffing mandrel 94. As compressor arm 98 swings into engagement with mandrel 94, it actuates normally closed two-way valve 164 which causes pneumatic cylinder 100 to advance compressor arm 98 to compress the stick 28, preventing it from expanding in length.

Casing stick 28 can be removed after the operator simultaneously actuates both spaced push buttons 250, 251. This operation opens solenoid valve 276, actuating valve 158 to operate pneumatic cylinder 87 which is attached to a gear rack, and engages a gear on shaft 95 thereby rotating the entire doffing device out of alignment with mandrel 12. Valve 158 also actuates valve 160 which reverses the air at pneumatic cylinders 100 and 102, thereby retracts and disengages compressor arm 98, and thus casing stick 28 may then be removed.

The operator can return the doffing device into alignment with mandrel 12 by repeating the simultaneous actuation of push buttons 250, 251. When the doffing device is in the out position, it contacts and closes switch 230, thereby opening switch 255. Thus, when the operator repeats the contact of push buttons 250, 251, solenoid 274 is actuated which reverses valve 158 thereby returning the doffing device to alignment with mandrel 12. When the doffing device is aligned with mandrel 12, it contacts mandrel interlock valve 162, clearing the shirring operation control circuit and assuring that the doffing device is empty of casing and correctly positioned with mandrel 12.

Thus, doffing unit 96 functions as a reservoir for finished casing 28, which is prevented from expanding in length by retention surface 98, as shown in FIG. 5.

The operations described are completely automatic but are dependent upon the electro-pneumatic interlock system shown in block diagrams on FIGS. 18 and 22.

In the electrical system diagram (FIG. 18), the power source which, for example, may be 440 v. A.C., 60 cycle, 3 phase, is used to drive motors 32, 82 and through transformer 278 provides 110 v. A.C. for the three interrelated control circuits schematically shown on FIGS. 19, 20 and 21. The 110 v. A.C. is connected to rectifier 262 to provide 90 v. D.C. for actuating solenoid operated motor brakes 280, 282, reel brake 284 and electrically operated clutch 60. The solenoid operated valves shown on the electrical control circuits and also on the pneumatic circuits are actuated by the 110 v. A.C., 60 cycle control circuit.

In the pneumatic system (FIG. 22), three pressure sources are used to actuate the pneumatic elements. They are supplied by appropriate manifolds. The 80 p.s.i. system provides power to operate the pneumatic cylinders actuating the various clamps, carriages, etc., described in detail in FIGS. 23, 24. The 20 p.s.i. system is used to return compressor arm 90, open clamps "C" and "K" and furnish the momentary mandrel inflation pressure at the start of the shirring cycle. The 8 p.s.i. air system is used to provide the mandrel inflation air during the larger part of the shirring cycle.

In operation at the start of a shirring cycle, as shown in FIG. 1, casing piece 22 which has previously been shirred and severed from unshirred casing 20, is in loosely shirred condition, and casing piece 26 is in tightly compressed condition between transfer arm 64 and adjacent surface of clamp "K." Mandrel 94 of doffing station 96 is vacant of casing.

In FIG. 13, the operating components are at 64 percent of the cycle. Casing piece 24 has been firmly compressed between advance surface of holdback arm 30 and adjacent surface of clamp "C." Clamp "K" is opened and a tightly-compressed casing has been transferred through the opened clamp along mandrel 12 by transfer arm 64, from the tightly-compressed zone onto doffing mandrel 94 to retain the formed stick 28. Retention surface 98 is shown swinging into engagement with mandrel 94 as transfer arm 64 is being disengaged therefrom. Arm 64 is then retracted and retention surface 98 is advanced to maintain casing piece 28 under compression.

In FIG. 14, the operating components are in position at 80 percent of the cycle. Doffing unit 96 is turned about and retention surface 98 is disengaged from mandrel 94, thus permitting doffing the finished casing stick 28 therefrom. Transfer arm 64 is retracted and holdback arm 30 is advanced, and each is shown engaging indexing carriage 93. This indexes the two arms into mutual position permitting the transfer gripping surface of arm 64 to fit between the two spaced holdback fork surface 31 and gripping surface 33 on mandrel 12.

In FIG. 15, the components are at 90 percent of the cycle. Shirring has been completed, clamp "C" is open, and transfer arm 64 is shown pushing casing 24 up to the adjacent surface of clamp "K." Holdback arm 30 has been swung out of engagement with mandrel 12, and retracted to the shirring zone immediately after shirring head S has been retracted from the zone of shirring.

Immediately before completion of the machine cycle, as shown in FIG. 1, clamp "C" is closed. Casing piece 26 is in position in tightly compressed condition between the transfer arm 64 and adjacent surface of clamp "K." Holdback arm 30 is swung into engagement with mandrel 12. Arm 30 is advanced when shirring head S is advanced to shirring position, and the leading edge 33 of holdback arm 30 engages the terminus of loosely shirred casing 22 thereby tensioning unshirred casing 20 and severing the same from the shirred casing 22.

The machine is arranged to operate continuously, repeating the automatic shirring, severing, compressing, doffing and transfer operations as long as successive shirred casing lengths are repeatedly removed from the terminal doffing station.

If the finished shirred and compressed casing is not removed from the doffing station before the compression cycle of the succeeding piece is terminated, the interlock system hereinbefore described, halts the machine at the end of the shirring cycle. The machine automatically resumes operation as and when the finished compressed shirred casing is removed from the doffing station.

The automatic shirring machine of this invention requires only 30 to 40 percent attendance by an operator, thus permitting one operator to attend several machines, or one machine arranged with several shirring positions.

This application is in part a continuation of my copending application Serial No. 34,413 filed June 7, 1960, now Patent No. 3,110,058, issued November 12, 1963.

What is claimed is:

1. In the manufacture of shirred casings, shirring a measured length of flattened cellulosic tubing in a shirring zone on a mandrel as a first stage of compression, applying axial force to the trailing end of said shirred length to advance it away from said shirring zone further along the same mandrel as a second stage of compression, and applying axial force to the trailing end of said advanced second stage length to advance said second stage length still further away from said shirring zone along the same mandrel as a third stage of compression.

2. In the manufacture of shirred casings, shirring a measured length of flattened cellulosic tubing in a shirring zone on a mandrel as a first stage of compression, applying axial force to the trailing end of said shirred length to advance it away from said shirring zone fulther along the same mandrel as a second stage of compression while a subsequent length is undergoing said first stage, and applying axial force to the trailing end of said advanced second stage length to advance said second stage length still further away from said shirring zone along the same mandrel as a third stage of compression while said second length is undergoing said second stage.

3. In the manufacture of shirred casings as claimed in claim 1, in which air is passed through said mandrel to the inside of the tubing to inflate the same, and the operation is started by increasing the air pressure greatly in excess of that normally used, to stiffen and advance the inflated tubing and enable the shirring step to grip and pleat the same.

4. In the manufacture of shirred casings as claimed in claim 3, in which the acceleration rate of the machine drive at the startup of the shirring cycle is slowed down greatly to permit the open end of the casing to seal itself against the adjacent holdback surface before the high speed shirring begins.

5. In the manufacture of shirred casings, passing a measured length of inflated tubing over a mandrel and through a shirring zone between moving shirring elements to form a shirred casing, terminating the shirring cycle, retracting said shirring elements rearward from the shirring zone to expose the terminus of said shirred casing while causing differential motion of said shirring elements to expose a length of unshirred tubing ahead thereof, applying axial force to said terminus to stress and part the tubing in said unshirred length thereof, returning said shirring elements to said shirring zone while reversing said differential motion thereof, and re-establishing the pleat pattern in the casing at the start of the next shirring cycle.

6. In the manufacture of shirred casings, passing a measured length of inflated tubing over a mandrel and through a shirring zone between rotating shirring elements which grip the inflated tubing, halting the tubing, retracting said shirring elements rearward from the shirring zone to expose the terminus of said shirred casing while differentially reversely rotating said shirring elements to expose a length of unshirred tubing ahead thereof, applying axial force to said terminus to stress and part the tubing in said unshirred length thereof, and returning said shirring elements to said shirring zone while rotating said shirring elements to remove folds, creases or slack from the wall of the casing prior to the start of the next shirring cycle.

7. In the manufacture of shirred casings as claimed in claim 1, in which the mandrel is maintained in the same stationary position for all of the steps recited.

8. In the manufacture of shirred casings as claimed in claim 2, in which the leading end of the subsequent length is held back to the same speed as that at which the trailing end of the second stage length is advanced.

References Cited in the file of this patent

UNITED STATES PATENTS

| | | |
|---|---|---|
| 1,993,480 | Hewitt | Mar. 5, 1935 |
| 2,583,654 | Korsgaard | Jan. 29, 1952 |
| 2,983,949 | Matecki | May 16, 1961 |